United States Patent
Yang et al.

(10) Patent No.: US 9,432,593 B2
(45) Date of Patent: Aug. 30, 2016

(54) TARGET OBJECT INFORMATION ACQUISITION METHOD AND ELECTRONIC DEVICE

(71) Applicants: BEIJING LENOVO SOFTWARE LTD., Beijing (CN); LENOVO (BEIJING) CO., LTD., Beijing (CN)

(72) Inventors: Guang Yang, Beijing (CN); Jian Yao, Beijing (CN)

(73) Assignees: BEIJING LENOVO SOFTWARE LTD., Beijing (CN); LENOVO (BEIJING) CO., LTD., Beijing (CN)

(*) Notice: Subject to any disclaimer, the term of this patent is extended or adjusted under 35 U.S.C. 154(b) by 0 days.

(21) Appl. No.: 14/387,813
(22) PCT Filed: Feb. 8, 2014
(86) PCT No.: PCT/CN2014/071895
§ 371 (c)(1),
(2) Date: Sep. 24, 2014
(87) PCT Pub. No.: WO2014/134993
PCT Pub. Date: Sep. 12, 2014

(65) Prior Publication Data
US 2015/0365607 A1     Dec. 17, 2015

(30) Foreign Application Priority Data
Mar. 4, 2013   (CN) .......................... 2013 1 0067442

(51) Int. Cl.
*H04N 5/33*   (2006.01)
*G01B 11/12*   (2006.01)
(Continued)

(52) U.S. Cl.
CPC ................. *H04N 5/33* (2013.01); *G01B 11/22* (2013.01); *G06K 9/00228* (2013.01); *G06K 9/00288* (2013.01); *G06K 9/20* (2013.01); *G06K 9/2027* (2013.01); *G06K 9/4604* (2013.01)

(58) Field of Classification Search
CPC ................................ H04N 5/33; G01B 11/22
See application file for complete search history.

(56) References Cited

U.S. PATENT DOCUMENTS 5,317,389 A * 5/1994 Hochberg .............. A61B 3/107
                                                       351/211
6,587,183 B1 * 7/2003 Morimura ............... G01B 11/25
                                                       348/E5.058
(Continued)

FOREIGN PATENT DOCUMENTS

CN           101720047          6/2010

OTHER PUBLICATIONS

Beijing Lenovo Software Ltd, English Translation of International Search Report on Patentability and Written Opinion of the International Searching Authority for PCT/CN2014/071895, mailed Sep. 8, 2015, The International Bureau of WIPO; 9 pages.
(Continued)

*Primary Examiner* — Tracy Li
*Assistant Examiner* — Mohammad J Rahman
(74) *Attorney, Agent, or Firm* — Peter Su; Dentons US LLP (57) ABSTRACT

Disclosed are a target object information acquisition method and an electronic device. The target object information acquisition method comprises a first infrared transmitter transmitting scattered light to a target area comprising at least one object; a photoreceptor receiving first reflected light output after at least one object reflects the scattered light in a first time period, and generating a depth image corresponding to the target area, acquiring the target image information about a target object; a second infrared transmitter transmitting scattered light to the target area; the photoreceptor receiving second reflected light output after at least one object reflects the scattered light in a second time period, and generating a feature image corresponding to the target area; and acquiring feature information. By means of the time division, the present invention solves the technical problem of a low acquisition rate for target object information in the prior art.

12 Claims, 3 Drawing Sheets

(51) Int. Cl.
*G06K 9/20* (2006.01)
*G01B 11/22* (2006.01)
*G06K 9/00* (2006.01)
*G06K 9/46* (2006.01)

(56) References Cited

U.S. PATENT DOCUMENTS

| | | | |
|---|---|---|---|
| 6,875,510 B2 * | 4/2005 | Kumazawa | B32B 7/02 349/112 |
| 8,521,411 B2 * | 8/2013 | Grabowski | G01C 21/365 701/454 |
| 8,777,742 B2 * | 7/2014 | Sato | A63F 13/06 463/32 |
| 9,044,163 B2 * | 6/2015 | Yamaguchi | A61B 1/0638 |
| 9,095,250 B2 * | 8/2015 | Yamaguchi | A61B 1/0638 |
| 2010/0225616 A1 * | 9/2010 | Kiyose | G06F 3/0412 345/175 |
| 2012/0154567 A1 * | 6/2012 | Yamaguchi | A61B 1/0638 348/68 |
| 2013/0038882 A1 * | 2/2013 | Umeda | G01C 3/08 356/610 |

OTHER PUBLICATIONS

English Abstract of Chinese Patent Application No. 101720047 A; Published on Jun. 2, 2010; 2 pages.

* cited by examiner

TARGET OBJECT INFORMATION ACQUISITION METHOD AND ELECTRONIC DEVICE

CROSS REFERENCE TO RELATED APPLICATIONS

This application is a national phase application based on international application number PCT/CN2014/071895, filed on Feb. 8, 2014, which claims priority of Chinese Patent Application No. 201310067442.3, filed on Mar. 4, 2013, the contents of both of which are incorporated by reference herein in their entireties.

BACKGROUND

This disclosure relates to a field of electronic technology, and particularly to a method for acquiring information of a target object and an electronic apparatus.

With a progressive development of science and technology, object tracing and depth measuring technology have developed rapidly, and are widely applied in fields of high speed on-line monitoring, robot vision, medical diagnosis etc. In various kinds of object tracing and depth measuring technology, an optical measuring method of non-contact characteristic is popular due to advantages of high resolution, non-destructibility, high velocity of data acquisition or the like. This method typically includes a single optical measuring method in which a set of measuring apparatus consisting of lasers and photoreceptors are adapted to measure position or texture characteristic of the target object.

Since the single optical measuring method cannot acquire the texture characteristic of the target object at the same time of object tracing and depth measuring, in order to solve this technical problem there is a conventional solution in which two sets of measuring apparatus are adopted simultaneously. One set consists of by a laser for transmitting disperse point light and a photoreceptor for measuring the position of the target object. The other set consists of a laser for transmitting scattered light and a photoreceptor for detecting the texture characteristic of the target object. Thus, with the cooperation of two lasers and two photoreceptors, positional information and texture information required by the user can be acquired.

However, it was found that there are still the following technical problems in the above-described solution relating to the procedure of implementing the technical solution of the embodiments:

Though the positional information and the texture information of the target object are acquired conventionally by two photoreceptors, since the difference in positions of the two photoreceptors results in a difference in angle and distance of the acquired information of the target object, the corresponding information of the target object can only be obtained accurately after being converted by a conversion algorithm. Therefore, there is a conventional technical problem regarding the low velocity of acquiring the information of the target object, as well as the large amount of calculation necessary to acquire the information of the target object.

SUMMARY

The embodiments provide a method for acquiring the information of the target object and an electronic apparatus for solving the conventional technical problem regarding the low velocity of acquiring the information of the target object and implementing a technical solution to increase the velocity of information acquisition.

The embodiments provide a method for acquiring information of a target object applied in an electronic apparatus. The method includes:

Transmitting disperse point light to a target region by a first infrared transmitter in the electronic apparatus, wherein at least one object is included in the target region;

Receiving first reflected light output by at least one object reflecting the disperse point light in a first time period by a photoreceptor in the electronic apparatus and generating a depth image corresponding to the target region based on the first reflected light;

Acquiring information of target image of the target object in at least one object based on the depth image;

Transmitting scattered light to the target region by a second infrared transmitter in the electronic apparatus;

Receiving a second reflected light outputted by at least one object reflecting the scattered light in a second time period following the first time period by the photoreceptor and generating a feature image corresponding to the target region based on the second reflected light;

Acquiring feature information of the target object based on the feature image and the information of target image.

Optionally, the first infrared transmitter and the second infrared transmitter are specifically a same multifunction infrared transmitter; or two infrared transmitters with different functions.

Optionally, when the first infrared transmitter and the second infrared transmitter are a same multifunction infrared transmitter, transmitting the disperse point light to the target region by the first infrared transmitter in the electronic apparatus and transmitting the scattered light to the target region by the second infrared transmitter in the electronic apparatus specifically includes controlling a light transmission sheet of the multifunction infrared transmitter to be partial light transmissive according to a preset shape in the first time period; transmitting the disperse point light to the target region through the light transmission sheet; controlling the light transmission sheet to be full light transmissive in the second time period; transmitting the scattered light to the target region through the light transmission sheet.

Optionally, after acquiring the information of the target image of the target object in at least one object, the method further includes deciding whether velocity of movement of the target object is larger than a preset velocity based on the information of the target image to obtain a first decision result; increasing frequency of picking up the feature image according to a preset proportion if the first decision result indicates that the velocity of movement of the target object is larger than the preset velocity.

Optionally, after acquiring the feature information of the target object, the method further includes detecting information of the edge of the target object based on the feature information and obtaining a variation parameter of a partial shape of the target object based on the information of the edge.

Optionally, after acquiring the feature information of the target object, the method further includes deciding whether the target object is a person based on the feature information; acquiring image information of a human face if it is decided that the target object is a person; executing recognition of human face based on the image information.

The embodiments further provide an electronic apparatus including:

A first infrared transmitter for transmitting disperse point light to a target region, wherein at least one object is included in the target region;

A second infrared transmitter for transmitting scattered light to the target region;

A photoreceptor for receiving first reflected light outputted by at least one object reflecting the disperse point light in a first time period and generating a depth image corresponding to the target region based on the first reflected light, and receiving a second reflected light outputted by at least one object reflecting the scattered light in a second time period following the first time period and generating a feature image corresponding to the target region based on the second reflected light;

A processor for acquiring information of target image of a target object in at least one object according to the depth image and acquiring feature information of the target object based on the feature image and the information of target image.

Optionally, the first infrared transmitter and the second infrared transmitter are specifically a same multifunction infrared transmitter; or two infrared transmitters with different functions.

Optionally, when the first infrared transmitter and the second infrared transmitter are a same multifunction infrared transmitter, the infrared transmitter specifically includes an infrared light source for transmitting infrared light; a light transmission sheet provided at a outer surface of the infrared light source; wherein, in the first time period, the light transmission sheet is partial light transmissive according to a preset shape so that the infrared light source transmits the disperse point light to the target region through the light transmission sheet, and in the second time period, the light transmission sheet is full light transmissive so that the infrared light source transmits the scattered light to the target region through the light transmission sheet.

Optionally, the electronic apparatus further includes a first deciding module for deciding whether the velocity of movement of the target object is larger than a preset velocity according to the information of the target image to obtain a first decision result, so that the processor increases a frequency of picking up the feature image according to a preset proportion when the first decision result indicates that the velocity of movement of the target object is larger than the preset velocity.

Optionally, the processor is further specifically for detecting information of the edge of the target object based on the feature information and obtaining a variation parameter of a partial shape of the target object based on the information of the edge.

Optionally, the electronic apparatus further includes a second deciding module for deciding whether the target object is a person according to the feature information and acquiring image information of a human face if the target object is a person, so that the processor is able to execute a recognition of human face based on the image information.

The above-described one or more technical solutions in the embodiments at least have one or more of the following technical effects:

1. By acquiring the depth image and the feature image of the target object at different timings and at a same distance and from a same angle by using a same photoreceptor, operation of mutual conversion when different photoreceptors acquire information of the target object from different positions is avoided, which solves the conventional technical problem of low velocity of information acquisition of the target object by increasing this velocity; at the same time, since conversion algorithm of information of the target object acquired by different photoreceptors from different positions is avoided, the amount of calculation is reduced significantly, which solves the conventional technical problem where a large amount of calculation in a procedure is necessary to acquire the information of the target object and further increases the velocity of information acquisition of the target object.

2. Since only one photoreceptor is adopted at the time of acquiring the depth information and the feature information of the target object in this disclosure, quantity of expensive photoreceptors is reduced, thus, making the product more cost-effective.

3. By transmitting the disperse point light and the scattered light at different times via the multifunction infrared transmitter so that the photoreceptor is able to acquire images of corresponding target object in corresponding time period, quantity of used infrared transmitters is reduced, which further reduces the cost of the product.

DETAILED DESCRIPTION

In the technical solution provided by the embodiments, by acquiring the depth image of the target object in the first time period by a photoreceptor and determining the image information of the target object according to that depth image, and by acquiring the feature image of the target object in the second time period by a same photoreceptor, that is, making a same photoreceptor acquire the depth image and feature image of the target object from a same angle and at a same distance with time division multiplexing so as to acquire the feature information of the target object, the operation of mutual conversion when different photoreceptors acquire the information of the target object from different positions is avoided, which solves the conventional technical problem of low velocity of the information acquisition of the target object by increasing this velocity.

The main implementation principle, the specific implementation mode, and the corresponding advantageous effect of the technical solutions of the embodiments achieved are described in detail in connection with the accompanying drawings of the specification.

The First Embodiment

Figure 1:
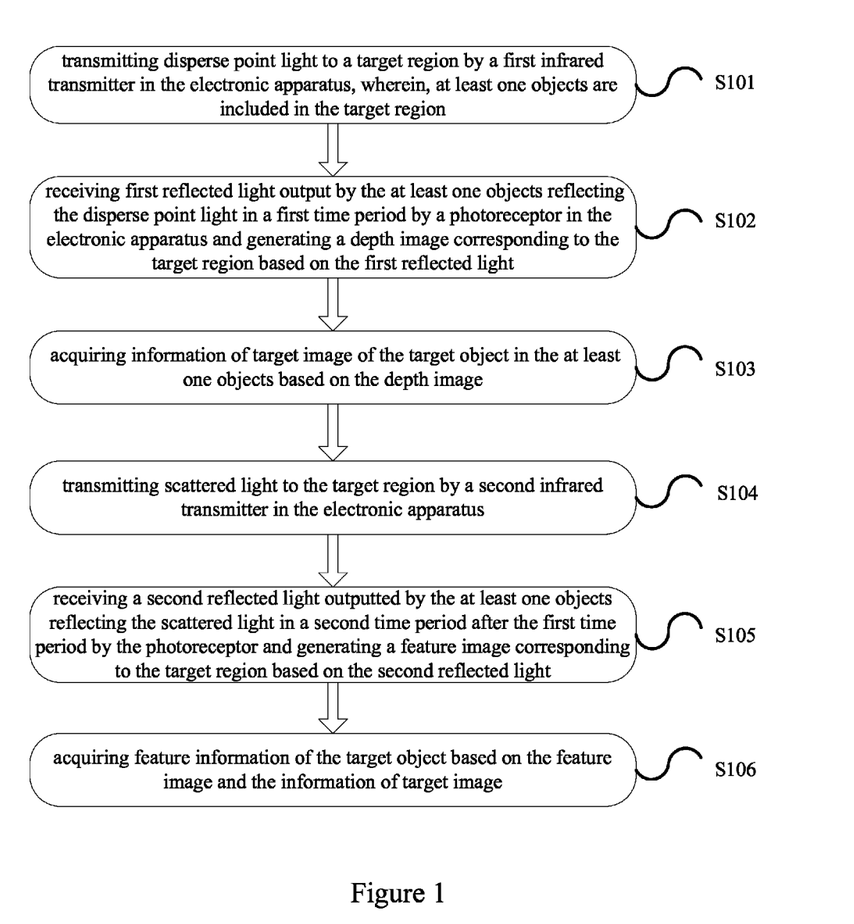
FIG. 1 is a flow chart of a method for acquiring the information of the target object provided by the first embodiment of this disclosure.

With reference to FIG. 1, the first embodiment of this disclosure provides a method for acquiring information of a target object applied in an electronic apparatus. The method includes:

S101: transmitting disperse point light to a target region by a first infrared transmitter in the electronic apparatus, wherein, at least one object is included in the target region.

In specific implementation procedure, in order to obtain a depth image of the target region, the disperse point light with a certain shape (for example, a circular shape, a square shape etc.) is required to be transmitted to the target region, the disperse point light specifically refers to a light ray distributed in point form. A light source of the disperse point light may be an ordinary light source of white light, and may also be a light source of infrared light. Since the infrared light has relatively strong penetrating power to cloud and mist in the air and is readily controlled, the infrared light is basically adopted in the current non-contact measuring technique. The infrared light would be reflected by an object to form reflected infrared light at the time of catching an object in a preset region. At this time, next step of S102 of the present embodiment is executed.

S102: receiving first reflected light output by at least one objects reflecting the disperse point light in a first time period by a photoreceptor in the electronic apparatus and generating the depth image corresponding to the target region based on the first reflected light.

The depth image is specifically an image representing the distance of the respective objects in the target region from a line connecting the infrared transmitter and the photoreceptor and in which objects with different distances are usually represented by different color. Thus, the distance of different objects in a same image from the line connecting the infrared transmitter and the photoreceptor can be understood clearly through the depth image, and therefore the target object can be found from background objects and by using a characteristic that it is close to the line connecting the infrared transmitter and the photoreceptor. Therefore, after acquiring the depth image of the target region, step S103 is executed.

S103: acquiring information of target image of the target object in the at least one objects based on the depth image.

Specifically, according to the distance of the respective objects in the depth image, an object has a closest distance from the line connecting the infrared transmitter and the photoreceptor is determined as the target object, and then the image information of the target object is acquired according to the determined target object, the image information may be positional information of the target object in the image. For example, yellow represents a closer object, green represents a farther object, and blue represent a farthermost object in the depth image. It assumes that there is a yellow object A, a green object B and a blue object C in the depth image obtained in step S102. At this time, the yellow object A is determined as being closest to the line connecting the infrared transmitter and the photoreceptor, and the yellow object A is determined as the target object, and positional information of the target object A in the image is acquired corresponding to the target object A. Since acquiring the positional information of the target object A is not enough for this measuring purpose at this time, it is necessary to execute step S104.

S104: transmitting scattered light to the target region by a second infrared transmitter in the electronic apparatus.

In the specific implementation procedure, since a single optical measuring method cannot acquire the feature information of the target object (for example, the texture information, partial outline information etc.) at the same time of tracking or measuring its depth, this embodiment detects the feature information by transmitting the scattered light to the target region by the second infrared transmitter in order to acquire the feature information of the target object. The scattered light specifically refers to a light ray, which is radiated in large area in spherical shape transmitted by a light source and forms reflected light rays in various kinds of angles after meeting with the object in the target region, and these reflected light rays form different images on photoreceptors due to difference of reflectors (for example, a reflected light of a table can form an image with a shape similar to the table on the photoreceptor, and a reflected light of a person can form an image of a person on the photoreceptor). Thus, it records characteristics of the respective objects in the target region like a camera. Therefore, step S105 is executed to acquire the feature image of the target region.

S105: receiving a second reflected light outputted by at least one object reflecting the scattered light in a second time period following the first time period by the photoreceptor and generating the feature image corresponding to the target region based on the second reflected light.

In order for an angle between the target object in the depth image acquired in the first time period and the infrared transmitter to be consistent with an angle between the target object in the feature image acquired in the second time period and the infrared transmitter, that is, the positions of the target object in the depth image and the feature image are kept constant, this application adopts a same photoreceptor. At the same time, in order to reduce error of the positions of the target object in the depth image and the feature image as much as possible, a time difference between the first time period and the second time period would be as small as possible (for example, it assumes that time of obtaining image of a frame by the photoreceptor is 1 millisecond, then the time difference between the first time period and the second time period should be less than 10 milliseconds). Step S106 is executed after acquiring the feature image corresponding to the target region by the photoreceptor.

S106: acquiring the feature information of the target object based on the feature image and the information of target image.

Since the positional information of the target object in the image has been determined in the information of the target image, the target object of a corresponding position can be searched in the feature image, to acquire the feature information of the target object, which specifically includes its texture information. For example, it assumes that the target object is a man holding a notebook computer, and then fine texture information such as a facial feature of this man, a gesture of this man and an appearance of the notebook computer or the like is acquired correspondingly.

Figure 2:
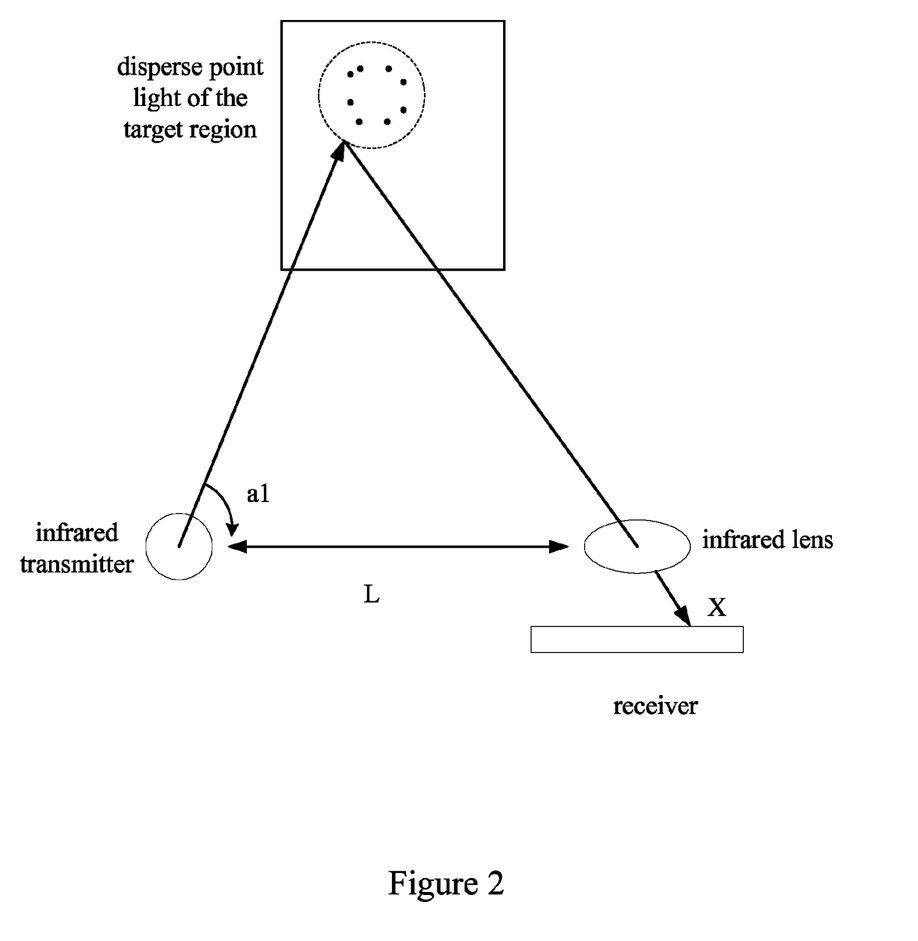
FIG. 2 is a schematic diagram of acquiring the depth image by a structured light method provided by the first embodiment of this disclosure.

In the specific implementation procedure, the disperse point light transmitted by the first infrared transmitter forms infrared reflected light after being reflected by at least one object, and the infrared reflected light passes through an infrared lens in the photoreceptor to hit on a charge coupled device (CCD) or a position sensitive device (PSD) of the photoreceptor. Since the reflected light thereof moves correspondingly when the object moves, pixel points formed on the photoreceptor thereof also move. Since a distance between the object and the electronic apparatus, that is, a distance between the line connecting the infrared transmitter and the photoreceptor, can be calculated according to optical trigonometry principles at this time, so generating the depth image corresponding to the target region in step S102 may specifically adopt the following method:

With reference to FIG. 2, it assumes that a distance between an infrared disperse point light source and the infrared lens of the photoreceptor is L, a pixel position on a receiver of the photoreceptor after being reflected by the object in the target region is X, and an exit angle of the infrared light is a1, then a distance d of the object from the electronic apparatus can be obtained by the following formula according to optical trigonometry principles:

$$d = L * \tan(a1) * \tan(X) / [\tan(a1) + \tan(X)]$$

For example, if L is 5 cm, X is 85, and a1 is $\pi/4$, the distance d obtained according to the above formula is about 4.6 cm.

After obtaining the distance between all of the objects in at least one object and the electronic apparatus, different values of the distance are represented by different colors to generate the corresponding depth image. After acquiring the depth image, the feature image of the target object is further acquired (for example, the corresponding feature image can be obtained by a diffuse reflection imaging principle).

In practical applications, the positions of the target object vary in some time. In order to acquire dynamic information of the target object in real time, steps S101 to S106 are executed cyclically to acquire continually the newest positional and feature information of the target object. At the same time, in order to avoid the target object causing the acquired feature image to be unclear due to its relatively high velocity when moving, this embodiment decides whether the velocity of movement of the target object is larger than a preset velocity to obtain a first decision result based on the information of target image acquired from the target object; and increases the frequency of picking up the feature image according to a preset proportion if the first decision result indicates that the velocity of movement of the target object is larger than the preset velocity.

Deciding whether the velocity of movement of the target object is larger than the preset velocity based on the information of target image is implemented by the following means specifically. Firstly, pixel velocity of the target object is obtained from the ratio of a distance of movement between a pixel point of the target object in the information of target image and the pixel point in the target object in a previous depth image and interval time, and since the actual velocity of movement of the target object always keep a proportional relationship with the velocity of movement of the pixel, the velocity of movement of the target object can be represented by the pixel velocity. For example, the target object moves by 5 pixel points between the first depth image and the second depth image, and the time interval between the first depth image and the second depth image is 20 milliseconds, then the pixel velocity of the target object is 0.25 point/millisecond. Then, at the time of deciding whether the velocity of movement is larger than the preset velocity, the preset velocity may be set according to the performance parameter of the electronic apparatus in advance. It assumes that the preset velocity is 0.1 point/millisecond, then the decision result of the velocity of 0.25 point/millisecond is larger than the preset velocity. The frequency of picking up the feature image needs to be increased in a preset proportion at this time, so the preset proportion may be set according to the parameter of the electronic apparatus. For example, increasing the frequency of picking up can be the ratio of the velocity of movement of the target object and the preset velocity, that is, in the case that the ratio of the velocity of movement of the target object of 0.25 point/millisecond and the preset velocity of 0.1 point/millisecond is 2.5, and if the original frequency of picking up the feature image is 50 frames per second, then it needs to be increased to 125 frames per second.

In the specific implementation procedure, after acquiring the feature information of the target object, in order to further obtain a dynamic change of the target object, the present embodiment further provides the following method:

Information of edge of the target object is detected based on the feature information acquired from the target object. In particular, the information of edge of the target object can be acquired from the parameter of brightness gradient of the target object in the feature information through a multi-level edge detection algorithm (Canny) or a Gauss Laplacian algorithm (Laplace). In addition, variation parameter of a partial shape of the target object is obtained based on the information of edge for recognizing the target object at the time of tracing the target object and acquiring instructions issued due to variation of shape of the target object in an interactive scene, such as a body sense game machine.

At the same time, whether the target object is a person is decided according to the feature information acquired from the target object; and image information of a human face is acquired if the target object is a person; so that a recognition of human face is executed, based on the image information of human face.

In the specific implementation procedure, the first infrared transmitter and the second infrared transmitter in S101 and S104 may be specifically two infrared transmitters with different functions, that is, the first infrared transmitter is an infrared transmitter of the disperse point light for transmitting the disperse point light to the target region, and the second infrared transmitter is an infrared transmitter of the scattered light for transmitting the scattered light to the target region. Alternatively, the first infrared transmitter and the second infrared transmitter may also be a same multifunction infrared transmitter specifically, that is, the multifunction infrared transmitter can transmit both of the disperse point light and the scattered light.

When the first infrared transmitter and the second infrared transmitter are the same multifunction infrared transmitter, the specific working procedure of the multifunction infrared transmitter is as follows:

In the first time period, a light transmission sheet of the multifunction infrared transmitter is controlled to be partial light transmissive according to a preset shape which is specifically a shape for facilitating the electronic apparatus to recognize (for example, a circular shape formed by a plurality of light transmission points, a square shape formed by a plurality of light transmission points, a sector shape formed by the plurality of light transmission points etc.). Thus, the infrared light transmitted by the multifunction infrared transmitter passes through the light transmission sheet to form the disperse point light of corresponding shapes. Next, the disperse point light is transmitted to the target region through the light transmission sheet so that the photoreceptor can receive the reflected disperse point light and generate the corresponding depth image after the disperse point light being reflected by at least one object in the target region at this time Immediately, in the second time period, the light transmission sheet is controlled to be full light transmissive, that is, the scattered light transmitted by the infrared light source of the multifunction infrared transmitter is made to transmit the light transmission sheet totally. Next, the scattered light can be transmitted to the target region through the light transmission sheet, so that the photoreceptor can receive the scattered light reflected by at least one object to generate the corresponding feature image after the scattered light being reflected by at least one object in the target region.

With time division multiplexing of the multifunction infrared transmitter, that is, transmitting the disperse point light in the first time period and transmitting the scattered light in the second time period, a half of the infrared transmitters can be reduced to further reduce the cost of manufacture of the product.

Second Embodiment

Figure 3:
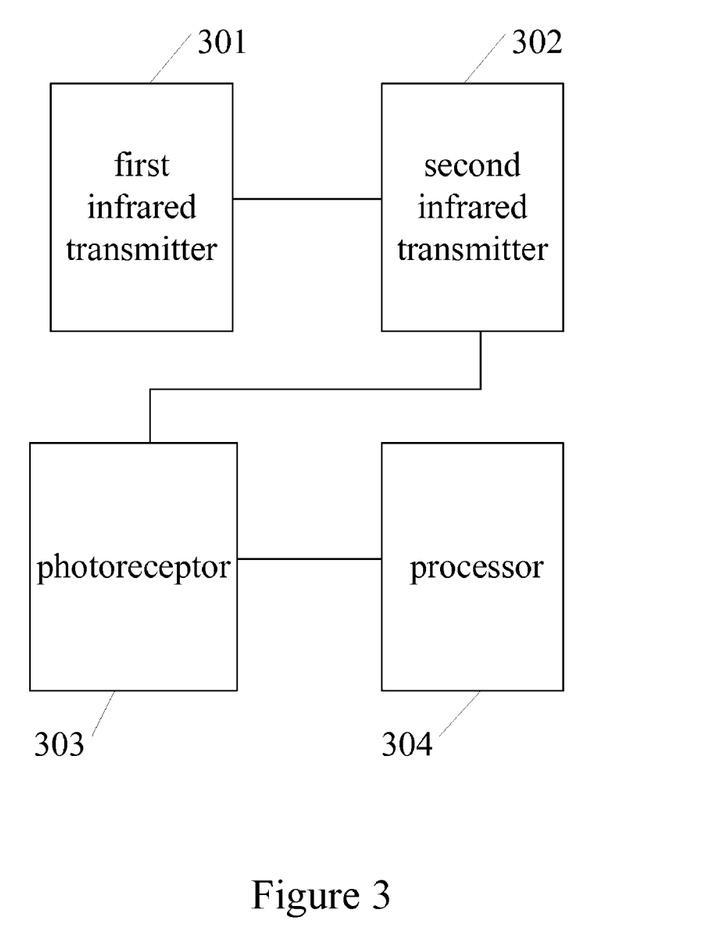
FIG. 3 is a structured block diagram of an electronic apparatus provided by the second embodiment of this disclosure.

With reference to FIG. 3, this embodiment further provides an electronic apparatus including:

A first infrared transmitter 301 for transmitting disperse point light to a target region, wherein at least one object is included in the target region;

A second infrared transmitter 302 for transmitting scattered light to the target region;

A photoreceptor 303 for receiving first reflected light outputted by at least one object reflecting the disperse point light in a first time period and generating a depth image corresponding to the target region based on the first reflected light, and receiving a second reflected light outputted by at least one object reflecting the scattered light in a second time period following the first time period and generating a feature image corresponding to the target region based on the second reflected light;

A processor 304 for acquiring information of target image of a target object in at least one object according to the depth image and acquiring feature information of the target object based on the feature image and the information of target image.

In the specific implementation procedure, the first infrared transmitter 301 and the second infrared transmitter 302 are specifically a same multifunction infrared transmitter; or two infrared transmitters with different functions.

In order to decrease quantity of the infrared transmitter used, when the first infrared transmitter 301 and the second infrared transmitter 302 may be a same multifunction infrared transmitter, the infrared transmitter specifically includes an infrared light source for transmitting infrared light; a light transmission sheet provided at an outer surface of the infrared light source; wherein, in the first time period, the light transmission sheet is partial light transmissive according to a preset shape so that the infrared light source transmits the disperse point light to the target region through the light transmission sheet, and in the second time period, the light transmission sheet is full light transmissive so that the infrared light source transmits the scattered light to the target region through the light transmission sheet.

In order to acquire a clear feature image when the velocity of movement of the target object is relatively high, the electronic apparatus further provides a first deciding module for deciding whether a velocity of movement of the target object is larger than a preset velocity according to the information of target image to obtain a first decision result, so that the processor increases the frequency of picking up the feature image according to a preset proportion when the first decision result indicates that the velocity of movement of the target object is larger than the preset velocity.

In order to acquire a condition of partial change of the target object, the processor 304 is specifically further for detecting information of edge of the target object based on the feature information and obtaining a variation parameter of a partial shape of the target object based on the information of edge.

In specific implementation procedure, in order to execute image recognition to the target object, the electronic apparatus further provides a second deciding module for deciding whether the target object is a person according to the feature information and acquiring image information of human face if the target object is a person, so that the processor is able to execute a recognition of human face based on the image information.

Since the electronic apparatus in the present embodiment is a virtual and/or entity device corresponding to the method, the detailed working procedure thereof is not described.

With one or more technical solutions in the embodiments, one or more of the following technical effects can be implemented:

1. By acquiring the depth image and the feature image of the target object at different timings and at a same distance and from a same angle by using a same photoreceptor, operation of mutual conversion when different photoreceptors acquire information of the target object from different positions is avoided, which solves the conventional technical problem of low velocity of information acquisition of the target object by increasing this velocity; at the same time, since conversion algorithm of information of the target object acquired by different photoreceptors from different positions is avoided, the amount of calculation is reduced significantly, which solves the conventional technical problem where a large amount of calculation in a procedure is necessary to acquire the information of the target object and further increases the velocity of information acquisition of the target object.

2. Since only one photoreceptor is adopted at the time of acquiring the depth information and the feature information of the target object in this disclosure, quantity of expensive photoreceptors is reduced, thus, making the product more cost-effective.

3. By transmitting the disperse point light and the scattered light at different times via the multifunction infrared transmitter so that the photoreceptor is able to acquire images of corresponding target object in corresponding time period, quantity of used infrared transmitters is reduced, which further reduces the cost of the product.

It is obvious that those skilled in the art can make various kinds of modifications and variations to this disclosure without departing from its spirit and scope. Thus, if these modifications and variations of this disclosure fall within the scope of its claims and the equivalent technology, this disclosure intends to incorporate these modifications and variations.

What is claimed is:

1. A method for acquiring information of a target object applied in an electronic apparatus, comprising:
   transmitting disperse point light to a target region by a first infrared transmitter in the electronic apparatus, wherein, at least one object is included in the target region;
   receiving first reflected light output by the at least one object reflecting the disperse point light in a first time period by a photoreceptor in the electronic apparatus and generating a depth image corresponding to the target region based on the first reflected light;
   acquiring information of target image of the target object in the at least one object based on the depth image;
   transmitting scattered light to the target region by a second infrared transmitter in the electronic apparatus;
   receiving a second reflected light outputted by the at least one object reflecting the scattered light in a second time period after the first time period by the photoreceptor and generating a feature image corresponding to the target region based on the second reflected light; and
   acquiring feature information of the target object based on the feature image and the information of target image.

2. The method of claim 1, wherein the first infrared transmitter and the second infrared transmitter comprises:
   a same multifunction infrared transmitter; or
   two infrared transmitters with different functions.

3. The method of claim 2, wherein when the first infrared transmitter and the second infrared transmitter are the same multifunction infrared transmitter, transmitting the disperse point light to the target region by the first infrared transmitter in the electronic apparatus and transmitting the scattered light to the target region by the second infrared transmitter in the electronic apparatus specifically comprises:
   controlling a light transmission sheet of the multifunction infrared transmitter to be partial light transmissive according to a preset shape in the first time period;
   transmitting the disperse point light to the target region through the light transmission sheet;

controlling the light transmission sheet to be full light transmissive in the second time period; and transmitting the scattered light to the target region through the light transmission sheet.

4. The method of claim 1, wherein after acquiring the information of target image of the target object in the at least one object, further comprising:

deciding whether velocity of movement of the target object is larger than a preset velocity based on the information of target image to obtain a first decision result; and increasing frequency of picking up the feature image according to a preset proportion if the first decision result indicates that the velocity of movement of the target object is larger than the preset velocity.

5. The method of claim 1, wherein after acquiring the feature information of the target object, further comprising:

detecting information of edge of the target object based on the feature information and obtaining a variation parameter of a partial shape of the target object based on the information of edge.

6. The method of claim 1, wherein after acquiring the feature information of the target object, further comprising:

deciding whether the target object is a person based on the feature information;

acquiring image information of human face of the person if it decides that the target object is the person; and executing recognition of human face based on the image information of human face to acquire a recognition result.

7. An electronic apparatus, comprising:

a first infrared transmitter for transmitting disperse point light to a target region, wherein at least one object is included in the target region;

a second infrared transmitter for transmitting scattered light to the target region;

a photoreceptor for receiving first reflected light outputted by the at least one object reflecting the disperse point light in a first time period and generating a depth image corresponding to the target region based on the first reflected light, and receiving a second reflected light outputted by the at least one object reflecting the scattered light in a second time period after the first time period and generating a feature image corresponding to the target region based on the second reflected light; and a processor for acquiring information of target image of a target object in the at least one object according to the depth image and acquiring feature information of the target object based on the feature image and the information of target image.

8. The electronic apparatus of claim 7, wherein the first infrared transmitter and the second infrared transmitter comprises:

a same multifunction infrared transmitter; or two infrared transmitters with different functions.

9. The electronic apparatus of claim 8, wherein when the first infrared transmitter and the second infrared transmitter are the same multifunction infrared transmitter, the infrared transmitter comprises:

an infrared light source for transmitting infrared light; and a light transmission sheet provided at an outer surface of the infrared light source;

wherein, in the first time period, the light transmission sheet is partial light transmissive according to a preset shape so that the infrared light source transmits the disperse point light to the target region through the light transmission sheet, and in the second time period, the light transmission sheet is full light transmissive so that the infrared light source transmits the scattered light to the target region through the light transmission sheet.

10. The electronic apparatus of claim 7, wherein the electronic apparatus further comprises:

a first deciding module for deciding whether a velocity of movement of the target object is larger than a preset velocity according to the information of target image to obtain a first decision result, so that the processor increases a frequency of picking up the feature image according to a preset proportion when the first decision result indicates that the velocity of movement of the target object is larger than the preset velocity.

11. The electronic apparatus of claim 7, wherein the processor comprises:

detecting information of edge of the target object based on the feature information and obtaining a variation parameter of a partial shape of the target object based on the information of edge.

12. The electronic apparatus of claim 7, further comprising:

a second deciding module for deciding whether the target object is a person according to the feature information and acquiring image information of human face of the person if the target object is the person, so that the processor is able to execute a recognition of human face based on the image information of human face to acquire a recognition result.

\* \* \* \* \*